Patented July 28, 1942

2,290,861

UNITED STATES PATENT OFFICE 2,290,861

CELLULOSE ETHERS PLASTICIZED WITH ETHERS OF CASHEW NUT SHELL LIQUID

Roger L. Campbell, Murray Hill, N. J., assignor, by mesne assignments, to The Harvel Corporation, a corporation of New Jersey No Drawing. Application February 11, 1938, Serial No. 190,137

3 Claims. (Cl. 260—13)

The present invention relates to compositions of matter comprising prepared cashew nut shell liquid and an alkyl ether of cellulose, the cashew nut shell liquid being prepared either before or after incorporation with the alkyl cellulose or in some cases having preparing steps performed on it both before and after the incorporation, and the present invention also relates to methods and steps for making and using the compositions of the present invention.

I have discovered that alkyl ethers of cellulose are compatible with and can be plasticised with alkyl ethers of cashew nut shell liquid or with alkyl ethers of certain modifications of cashew nut shell liquid. Among the alkyl ethers of cellulose which are suitable for the practice of the present invention are, for example, methyl cellulose, ethyl cellulose, propyl cellulose, butyl cellulose, amyl cellulose and the higher alkyl ethers of cellulose.

Among the modifications and derivatives of cashew nut shell liquid which are suitable for the practice of the present invention are alkyl ethers of cashew nut shell liquid, for example, methyl, ethyl, propyl, butyl and amyl ethers of cashew nut shell liquid; the above identified alkyl radicle ethers of Cardanol (Cardanol is a phenol having an unsaturated hydrocarbon side chain and is identified in U. S. Patent Number 2,098,824); the above named and identified alkyl ethers after they have been transformed or thickened by heating in an atmosphere of carbon dioxide; and the ethers of polymerized cashew nut shell liquid or the polymerized ethers of cashew nut shell liquid; and various products of condensation of aldehydes with cashew nut shell liquid, with polymerized cashew nut shell liquid, with cardanol and with the ethers of cashew nut shell liquid, cardanol and polymerized cashew nut shell liquid.

*Example 1.*—As an illustrative example of the practice of the method of the present invention and of the products obtained thereby there is given the following particular process for making flexible, extruded tubing suitable for use as electrical insulation. Three parts by weight of ethyl cellulose (containing 48% $\cdot OC_2H_5$) and two parts of primary amyl ether of cashew nut shell liquid were milled together on a heated rubber mixing roll until the two were thoroughly intermingled and dissolved together. The resulting composition when cold is tough and flexible, is thermoplastic at 250° F., and can be rolled into sheets and can be extruded in the form of sheets, ribbon and tubing.

*Example 2.*—A condensation product of 55 parts by weight of a 40% water solution of formaldehyde and 166 parts of cardanol was made by heating under reflux condenser for about one hour with about one hundred parts of commercial ammonia, in solution in ethyl alcohol. The reaction product is left to stand until water of reaction and other water present separates into a distinct layer after which the water is taken off. The reaction product, in solution in the alcohol, is then heated at about 250° F. to drive off the alcohol and any remaining water.

Equal parts of the above reaction product and ethyl cellulose (48% $\cdot OC_2H_5$) are milled together on a rubber mill to get a thorough mixture and solution, the resulting solution or composition being suitable for the formation of sheets, ribbons, tubes and other forms by rolling or extruding.

*Example 3.*—One part by weight of milled Pliolite, three parts of ethyl cellulose (47.1% $\cdot OC_2H_5$), two parts primary amyl ether of cashew nut shell liquid and one part of the condensation reaction product of Example 2, above, are milled on a rubber mixing rolls to obtain thorough and homogeneous mixture. The composition or solution is thermoplastic and can be sheeted or extruded.

*Example 4.*—Four parts by weight of ethyl cellulose (47% $\cdot OC_2H_5$), three parts primary amyl ether of cashew nut shell liquid and one part of the condensation reaction product of Example 2, above, are milled on rubber mixing rolls to obtain a thermoplastic solution which can be sheeted or extruded.

*Example 5.*—Three parts by weight of ethyl cellulose (47% $\cdot OC_2H_5$), three and one-half parts of "Aroclor 1262" and one part of the condensation reaction product of Example 2, above, are milled on rubber mixing rolls to obtain a thermoplastic composition which can be sheeted or extruded. This composition is flame resisting, that is, it does not support combustion.

The compositions of Examples 1 to 5 are soluble in certain solvents, for example, ethyl alcohol, propyl alcohol, butyl alcohol and toluol. The compositions of Examples 2 to 5 can be modified by heating the condensation reaction product of Example 2, at 125° C., for example, to carry the condensation reaction further. They are then less soluble in the above named solvents.

The primary amyl ethers of cashew nut shell liquid or other alkyl ethers of cashew nut shell liquid and primary amyl ether of cashew nut shell liquid which has been thickened by heating in an atmosphere of $CO_2$ are compatible in all proportions with ethyl cellulose having an ethoxy ($OC_2H_5$) content of 47 to 48%. The primary amyl ethers of cashew nut shell liquid are compatible with ethyl cellulose of ethoxy content of 44%.

The formaldehyde condensation product described in Example 2, above, is compatible with ethyl cellulose of ethoxy content of 44% to 48%.

Distilled primary amyl ethers of cashew nut shell liquid are compatible with ethyl cellulose of 44% to 48%.

The compositions of Examples 1 to 5 have good dielectric strength, are flexible and retain their flexibility after being subjected to heat as high as 450° F.

Ellis, "Chemistry of Synthetic Resins," 1935, vol. 2, page 1145, describes "Aroclor" materials which are chlorinated diphenyls suitable for the practice of the present invention.

Having thus described my invention, what I claim as new and desire to protect by Letters Patent is:

1. A composition of matter which is tough and flexible at normal temperature and workable on mixing rolls at high temperatures comprising an alkyl ether of a cashew nut shell liquid polymer, and a solvent soluble, highly substituted lower fatty alcohol ether of cellulose.

2. A composition of matter which is tough and flexible at normal temperature and workable on mixing rolls at high temperatures comprising an alkyl ether of a cashew nut shell liquid polymer, a solvent soluble, highly substituted lower fatty alcohol ether of cellulose, and a fire resistant chlorinated diphenyl.

3. The thermoplastic composition adapted for sheeting and extrusion through dies and comprising an intermixture of from about ⅓ of 1 part to about 1 part of an alkyl ether of cashew nut shell liquid and about 1 part of a solvent soluble, highly substituted lower fatty alcohol ether of cellulose.

ROGER L. CAMPBELL.